(12) United States Patent
Xu et al.

(10) Patent No.: US 6,830,071 B2
(45) Date of Patent: Dec. 14, 2004

(54) MICROVALVE DEVICES

(75) Inventors: Diao Xu, Singapore (SG); Lun Sheng Pan, Singapore (SG); Teng Yong Ng, Singapore (SG); Khin Yong Lam, Singapore (SG)

(73) Assignee: Institute of High Performance Computing, Singapore (SG)

( * ) Notice: Subject to any disclaimer, the term of this patent is extended or adjusted under 35 U.S.C. 154(b) by 0 days.

(21) Appl. No.: 10/043,761

(22) Filed: Jan. 10, 2002

(65) Prior Publication Data

US 2002/0129857 A1 Sep. 19, 2002

(30) Foreign Application Priority Data

Feb. 6, 2001 (SG) .......................................... 200100657

(51) Int. Cl.[7] ............................................. F16K 11/10
(52) U.S. Cl. .................................................. 137/625.33
(58) Field of Search ........................ 137/625.3, 625.33; 251/129.06

(56) References Cited

U.S. PATENT DOCUMENTS

| | | | | |
|---|---|---|---|---|
| 4,538,642 A | * | 9/1985 | Schutten et al. | 137/625.28 |
| 5,096,643 A | * | 3/1992 | Kowanz et al. | 264/130 |
| 5,142,781 A | | 9/1992 | Mettner et al. | |
| 5,380,396 A | * | 1/1995 | Shikida et al. | 156/630 |
| 5,452,878 A | | 9/1995 | Gravesen et al. | |
| 5,967,187 A | * | 10/1999 | Horne et al. | 137/875 |
| 6,089,534 A | * | 7/2000 | Biegelsen et al. | 251/129.01 |

FOREIGN PATENT DOCUMENTS

DE 198 16 283 A1 10/1999

* cited by examiner

*Primary Examiner*—John Fox
(74) *Attorney, Agent, or Firm*—Akin Gump Strauss Hauer & Feld, LLP

(57) ABSTRACT

An electrostatically operated, normally closed micromachined flow-through microvalve device comprises a stationary valve plate layer and a movable valve plate layer, the latter including an electrode plate such that it is deflectable by electrostatic forces under an applied voltage, and having a plurality of movable valve elements, each valve element moving with a degree of independence from the remaining valve elements. Application of a voltage results in deflection of the movable valve elements, the order of deflection depending on the relative magnitude of the electrostatic force experienced by the respective associated portion of the movable valve plate layer. This can be prescribed by the geometry of the device, and a preferred example provides a different separation between different portions of the movable valve plate layer and a further electrode plate in a device base plate layer.

17 Claims, 4 Drawing Sheets

MICROVALVE DEVICES

BACKGROUND OF THE INVENTION

The invention relates to microvalve devices. In a preferred form, the invention concerns electrostatically operated micromachined flow-through microvalve devices.

Electrostatically operated micromachined integrated silicon, multilayered flow-through microvalves are known. Such microvalve devices are fabricated by micromachining processes, known in general in the field of semiconductor chip technology. They have a wide variety of applications, in particular in computer-controlled systems where low voltages are available and high precision is needed. Pneumatic power systems and ink jet printing devices are examples of relevant applications, and in such apparatus many such microvalves may be required. They must be inexpensive, reliable, efficient, small, and fully compatible with electronic interfaces. They must be capable of repeatable, high precision performance, exhibiting sharp flow cutoff and opening characteristics.

In general terms, a microvalve device has a fluid inlet and a fluid outlet on opposite sides of an integrated silicon wafer construction. An element of the construction forms a valve seat, whilst a further element forms a complementary valve closure, this further element being displaceable under action of an electrostatic force to selectively engage and disengage the valve seat, so to respectively close and open a flow path.

These known electrostatically operated microvalves require an extremely close spacing between an electrode arranged to form part of the valve seat and an electrode associated with the valve closure element, over an area that is substantially larger than the flow orifice, in order to obtain effective valve closures against high fluid pressures whilst avoiding excessive operating voltages. An example of an electrostatically operated microfabricated microvalve is disclosed in U.S. Pat. No. 5,244,537, in which device the closing of the orifice of a normally open valve is controlled by way of two electrodes. The microvalve is an integral structure produced on one piece of silicon with the inlet and outlet on opposite sides of the silicon wafer, and the flow rate of the microvalve is limited by the circumference of the single orifice of the valve.

BRIEF SUMMARY OF THE INVENTION

The present invention provides a normally-closed electrostatic microvalve device of multilayer form comprising:
  a stationary valve plate layer, having a plurality of fluid flow orifices therethrough;
  a moveable valve plate layer, comprising a plurality of valve elements to close the fluid flow orifices of the stationary valve plate layer, one valve element able to move with a degree of independence from the remaining valve elements;
  the movable valve plate layer arranged for deflection under an applied electrostatic force from a normal closed position, in which each of said fluid flow orifices of the stationary valve plate layer is closed by a valve element, to an open position in which one or more of the valve elements is displaced from said stationary valve plate layer.

In a preferred form, the movable valve plate layer comprises resilient flexible portions interconnecting the valve elements, enabling a degree of independent movement to each valve element. The valve elements are preferably supported within the device by resilient restoring support means, such as thin beam elements between the valve elements and a surrounding substrate. The resilient flexible portions interconnecting the valve elements and the resilient restoring support means may be provided by a thin membrane layer forming an integral part of the movable valve plate layer.

In a preferred form of the invention, the device includes a base plate layer spaced from said stationary valve plate layer, having at least one inlet fluid flow orifice therethrough, the base plate layer and the stationary valve plate layer defining therebetween an inlet chamber, the movable valve plate layer being disposed for movement within said inlet chamber, and wherein the base plate layer includes a first conductive electrode element and the movable valve plate layer includes a second conductive electrode element such that application of an electrical potential difference between the respective electrode elements creates an electrostatic force on the moveable valve plate layer to activate the microvalve.

Preferably, application of an electrical potential difference applied between said respective electrode elements results in greater electrostatic force on one valve element than on the remaining one or more valve elements. Each valve element may be associated with a portion of said second electrode layer, and the separation between said first and said second electrode element differs for different ones of said portions when the microvalve is in its normal closed configuration. This may be accomplished by disposing the first electrode layer in a stepped configuration across the base plate layer, so to provide the differing separations between said first electrode layer and the different portions of said second electrode layer.

Preferably, the device includes an outlet plate layer spaced from said stationary valve plate layer, having at least one outlet fluid flow orifice therethrough, the outlet plate layer and the stationary valve plate layer defining therebetween an outlet chamber.

The actuation of the microvalve, then, is effected by the application of an input voltage that results in an electrostatic force between the two electrodes. An important advantage of the valve of the present invention is its ability to manage relatively large flow rates using a normal operating voltage of the order of voltage available conventionally in IC operation. This is achieved by the structure of the multivalve elements in a normally closed microvalve device. In the preferred form, a plurality of valve plates open sequentially to overcome the decreasing pressure difference across the valve.

BRIEF DESCRIPTION OF THE SEVERAL VIEWS OF THE DRAWINGS

The foregoing summary, as well as following detailed description of preferred embodiments of the invention, will be better understood when read in conjuction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

For homogeneous dielectrics between electrodes, the electrostatically generated force $F_e$ increases directly with the square of the voltage U applied between the electrodes and inversely with the square of the distance (or gap) d separating the two electrodes as stipulated in the following equation Eq. 1.

$$Fe = \frac{1}{2}\varepsilon\varepsilon_0 A_e \left(\frac{U}{d}\right)^2 \qquad \text{Eq. 1}$$

where $\epsilon$ is the dielectric constant, $\epsilon_o$ is the permittivity of free space ($\epsilon_o$=8.85×10$^{-12}$ F/m) and $A_e$ is the effective charging area.

According to Eq. 1, variations in the effective charging area, the applied voltage, and the distance between the electrodes will affect the magnitude of the electrostatic force between the electrodes. Clearly an increase in the electrostatic area $A_e$ will provide a linear increase in force, $F_e$, and in most applications the valve plate is designed with an area that is significantly larger than the area of the valve opening, with typical lateral dimensions in the range of a few millimeters. In order for the valve to remain within micro dimensions, however, the effective charging area that can be incorporated into the valve is still very limited, hence the overall electrostatic actuating force that can be generated between the electrodes in the microvalve is also limited.

Increasing the applied voltage will increase the electrostatic force between the valve plates, by a square law. However the use of microvalves in integrated circuits limits the voltage available to that which is used in the IC application. This voltage does not commonly exceed 5V.

Figure 7:
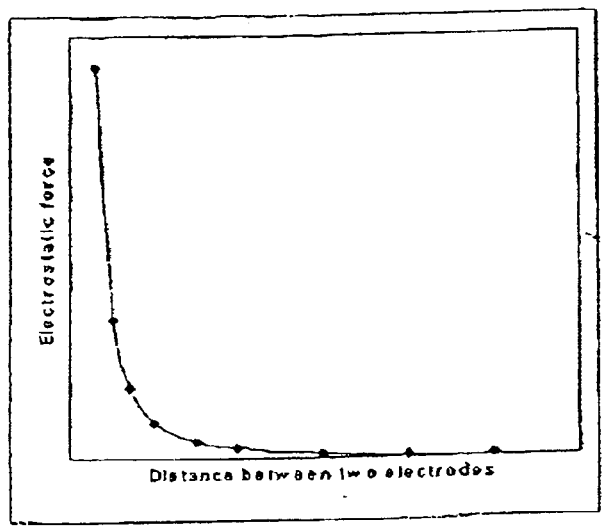
FIG. 7 illustrates graphically the relationship between the electrostatic force applied to a microvalve and the distance between the two electrodes of that microvalve.
Figure 8:
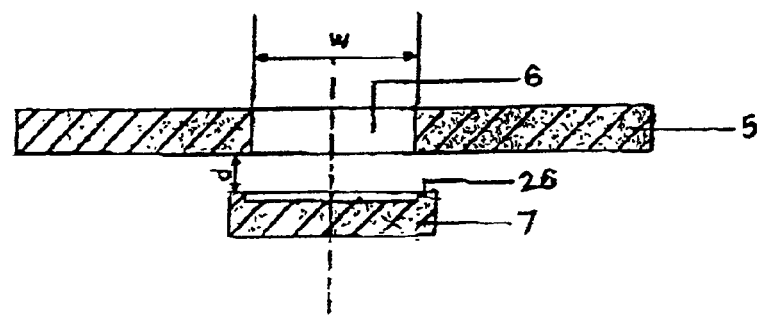
FIG. 8 is a schematic view of the microvalve opening and the gap between the valve plate and the valve seat of that microvalve.

Finally, the distance between the electrodes affects the electrostatic force generated in the valve by a square law relationship. FIG. 7 illustrates the relationship between the electrostatic force and the distance between the two electrodes and indicates that any further decrease in the distance between the electrodes below a certain threshold will cause the electrostatic force to increase sharply. However, reducing the distance between the electrodes also reduces the circumferential area of the available fluid flow orifice between the valve plates, which naturally subsequently reduces the flow rate of the valve.

To open a normally closed valve meaning that the valve plate is in its closed position when unenergized, the electrostatic force $F_e$ must be greater than the hydrostatic force $F_p$ resulting from the pressure difference across the valve plate.

$$F_e > F_p \qquad \text{Eq. 2}$$

$$F_p = A_p(p_1 - p_2) \qquad \text{Eq. 3}$$

where $F_p$ is the pressure acting upon the valve plate, $A_p$ is the application area of the valve plate, $p_1$ is the upstream pressure acting on the valve plate (usually equal to the inlet pressure $p_{in}$ if the pressure drop across the inlet channel is negligible) and $p_2$ is the downstream pressure acting on the valve plate.

When the valve plate is at its closed position, $p_2$ is equal to the outlet pressure $p_{out}$. However, as the valve plate is opened, $p_2$ is no longer equal to $p_{out}$. In the open position, $p_2$ can be calculated based on the following equation:

$$p_2 = p_1 - \Delta p_{1-2} \qquad \text{Eq. 4}$$

$\Delta p_{1-2}$ is the pressure loss across the valve plate. It can be determined from:

$$\Delta p_{1-2} = \xi \left(\frac{\gamma V_1^2}{2}\right) \qquad \text{Eq. 5}$$

where $\xi$ is the drag coefficient across the valve plate, which is dependent on the flow rate and the gap size between the valve plate and the valve seat; $\gamma$ is the density of the fluid; and $V_1$ is the velocity of the upstream flow.

With consideration for the pressure loss along the outlet channel $\Delta p_{channel}$, $p_2$ is greater than the outlet pressure $p_{out}$, when the valve plate is at its open position. At this position, the outlet pressure can be calculated according to:

$$p_2 = p_{out} + \Delta p_{1-2} + p_{channel} \qquad \text{Eq. 6}$$

The preceding equations indicate that an exceptionally large electrostatic force is required to open a normally closed valve, since the hydrostatic force $F_p$ acting on the upstream side of the valve plate is at its maximum value when the valve is in the closed position. Opening the valve results in an instantaneous decrease in $F_p$ as the backward pressure $p_2$ acting on the valve plate increases. As $p_2$ continues to rise, the pressure differential across the valve plate further decreases resulting in a subsequent decrease in the electrostatic force required to continue to open the partially open valve. The electrostatic force required to further open an already partially open valve is significantly less than the electrostatic force required to open the valve when it is initially closed.

Unlike the situation in conventional valves of microdimensions, the dimensional factor that governs the flow rate through a microvalve is not the size of the valve opening itself, but the distance between the valve plate and the valve seat, even when the valve is in the fully opened position. A typical microvalve may exhibit a square opening with dimensions 0.2 mm×0.2 mm and a distance of 5 μm between the valve plate and the valve seat, resulting in a valve opening area of 0.2 mm×0.2 mm=0.04 mm$^2$. The peripheral area between the valve plate and the valve seat, available for fluid flow, is thus 4×0.2 mm×0.005 mm 0.004 mm$^2$, which is ten times smaller that the area of the valve opening. Therefore, since the flow rate through the valve is not determined by the area of the valve opening but by the peripheral area of the valve orifice between the valve plate and the valve seat, the flow rate that can be achieved in a typical microvalve, with a valve plate to valve seat distance of 5 μm, is significantly limited. The area of the valve opening does, however, influence the hydraulic force acting on the valve plate and hence the pressure difference $\Delta p_{1-2}$ across the valve. In order to increase the flow rate through the valve, a tradeoff must be made between distance from the valve plate to the valve seat and the electrostatic force that is to be generated between the electrodes.

The present invention addresses this situation by arranging a series of valve openings inside a single microvalve unit, where the distance separating the valve plate from the valve seat may differ for each said valve opening. When a voltage is applied to the electrodes, the valve plate with the smallest distance to the valve seat will displace first since, in accordance with Eq. 1, it will experience the greatest electrostatic force. As this first orifice is opened, fluid enters the chamber, which results in a backpressure $p_2$ acting on the downstream side of the valve plate. Consequently a lower electrostatic force is necessary to open the second valve plate (which may therefore have a larger gap) and each subsequent valve plate with increasing distance from the valve seat will thus be opened in similar succession. This cascade effect affords a relatively large total peripheral flow area for a relatively small actuation voltage.

Figure 1:
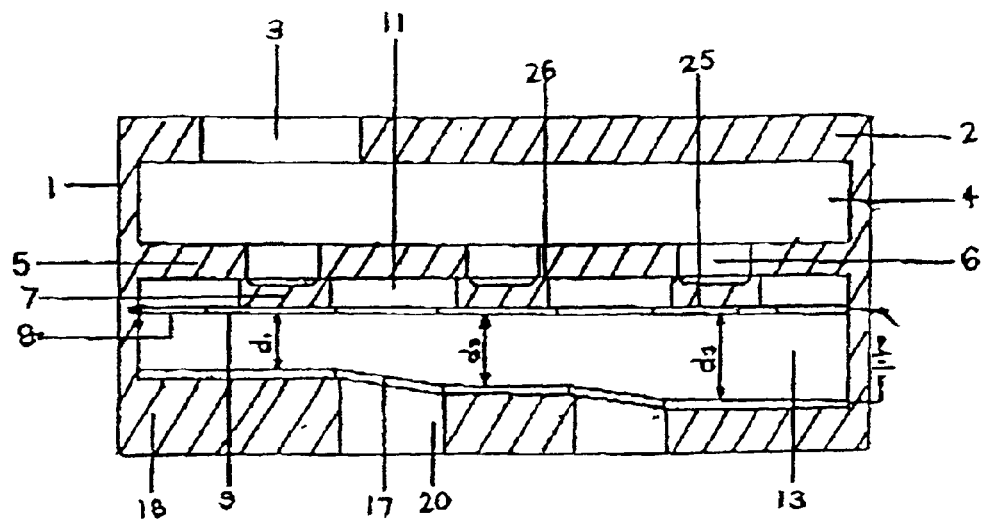
FIG. 1 is a cross section view of one preferred embodiment of the invention and shows a microvalve in the normally closed unenergized position.

In FIG. 1 microvalve 1 is in its normally closed, unenergized position. Microvalve 1 is a multilayered structure comprising a silicon substrate layer 18, a movable valve plate layer 25 including three valve plates 7, a mid-orifice layer 5 and an outlet-port layer 2. The valve is therefore made up of four overlaying layers. In the valve's closed position, the hydrostatic force or pressure differential across valve plates 7 maintains movable valve plate layer 25 in its closed position. Sealing peripheral lips 26 of valve plates 7 firmly contact the edges of orifices 6 at mid-orifice layer 5 such that the fluid is unable to pass through orifices 6. In this state, the pressure differential across valve plates 7, $\Delta p_{1-2}$ is equal to $p_{in}-p_{out}$.

Figure 2:
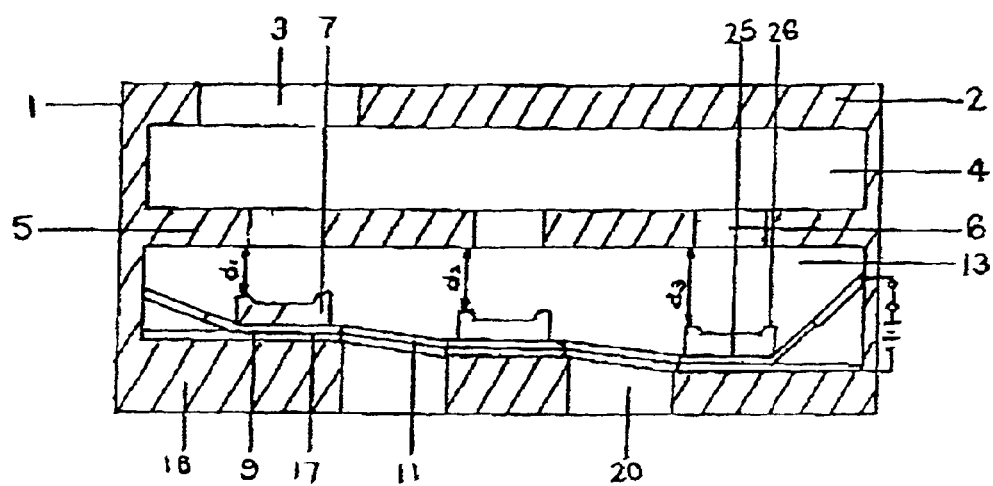
FIG. 2 is likewise a cross section view and shows the microvalve of FIG. 1 in its energized open position.

In FIG. 2, microvalve 1 is in its open energized position. On activation of the power source the electrostatic charge in electrodes 9 and 17 results in mutual attraction between the electrodes causing movable plate 25 to displace downwardly toward substrate layer 18.

Figure 3:
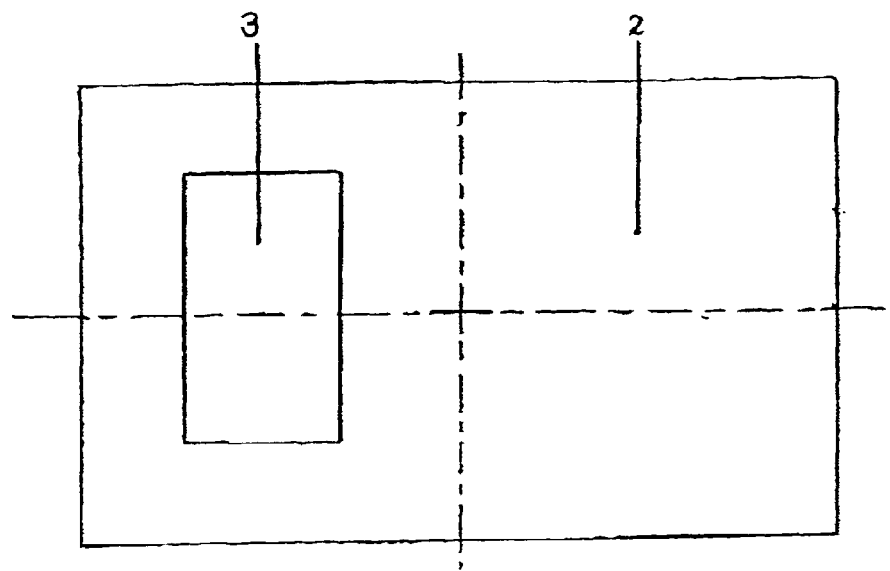
FIG. 3 is a plan view of an outlet port layer of the preferred embodiment of the invention.

FIG. 3 illustrates in plan view microvalve 1, showing the outlet-port layer 2. This is a silicon layer with a rectangular shaped main outlet port 3. Between this layer 2 and mid-orifice layer 5 is defined an outlet chamber 4. The pressure $p_2$ in outlet chamber 4 is equal to the outlet pressure $p_{out}$ when valve plates 7 are in their normally closed position. However, when the valve plates are in the open position, $p_2$ is larger than $p_{out}$ as a result of the pressure drop along the downstream microchannel (see Eq. 6).

Figure 4:
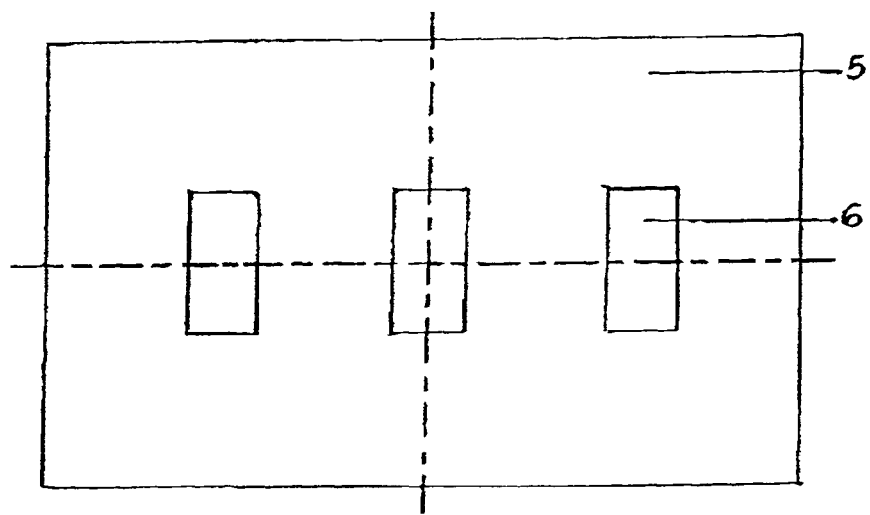
FIG. 4 is a plan view of a mid-orifice layer, which shows three internal orifices of the preferred embodiment of the invention.

In one preferred embodiment of the invention, mid-orifice layer 5 (FIG. 4) contains three rectangular spaced orifices 6 through the layer, not necessarily of equal dimensions. As previously mentioned, an important factor in the determination of the flow rate through the valve is the peripheral area of the orifices, being calculated as the product of the perimeter of the orifice 6 and the distance between orifice layer 5 and valve sealing edges 26. In FIG. 3 and FIG. 4 the orifices 6 have been shown as being rectangular, and although a rectangular orifice achieves a larger perimeter area than a circular orifice with the same distance between the orifice layer 5 and the valve seal edges 26, the shape of the orifice is not intended to be limited to any particular shape. The area of the orifice opening also affects the electrostatic force that is generated between the electrodes, as indicated in Eq. 1, since the remaining area of mid-orifice layer 5 is directly proportional to the available electrostatic charging area, $A_e$. Therefore, the smaller the orifices 6, the larger the available charging area, and the larger the electrostatic force that can be generated within the valve, with the trade-off that a smaller orifice limits the orifice through-flow area.

Figure 5:
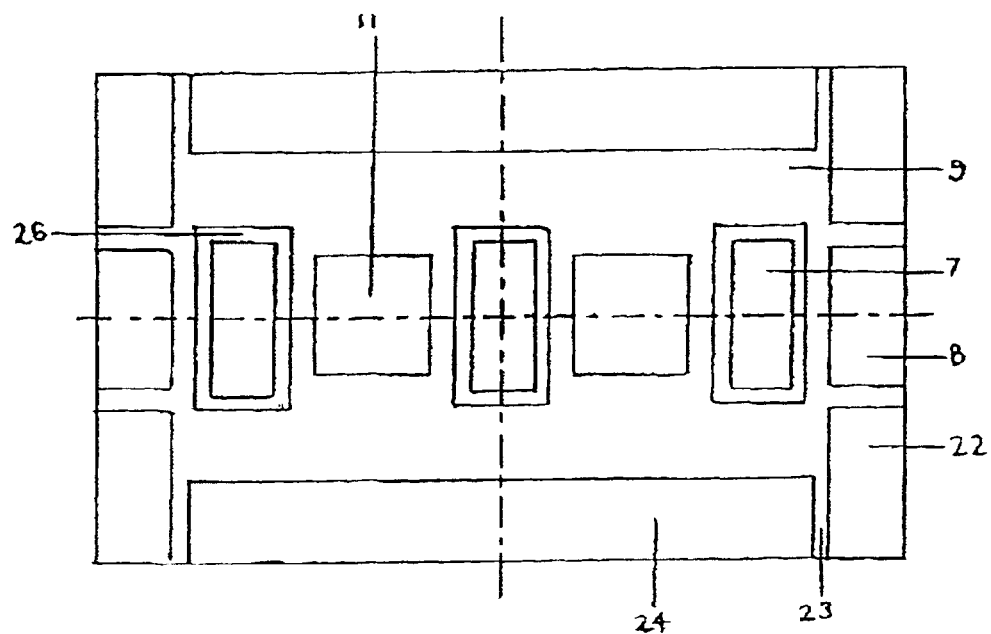
FIG. 5 is a plan view of a moveable valve-plate layer showing the three valve plates of the preferred embodiment of the invention.

FIG. 5 is a plan view of the movable valve plate layer 25. This movable valve plate layer 25 includes a conductive metal layer 9 defining the charging area $A_e$ and three separately distributed silicon valve plates 7 with sealing lips 26 around their edges. In one preferred embodiment of the invention, the metal layer 9 itself has a plurality of openings 8, 11, 22 and 24, the total area of these openings being much larger than the total opening area of the orifices 6 on orifice layer 5. This improves the ability of the fluid to flow across the valve plate layer 25 once this layer is moved into the opening position illustrated in FIG. 2. Movable plate layer 25 is connected to the surrounding substrate by eight thin elastic beams or strips 23 as shown, the width-to-length ratio of strips 23 being small, such that the elastic force that is generated when movable valve plate 25 is moved by the electrostatic force is small compared with the electrostatic force generated between the electrodes when the microvalve is energized. Mid-orifice layer 5 and substrate layer 18 define an inlet chamber 13 therebetween.

Figure 6:
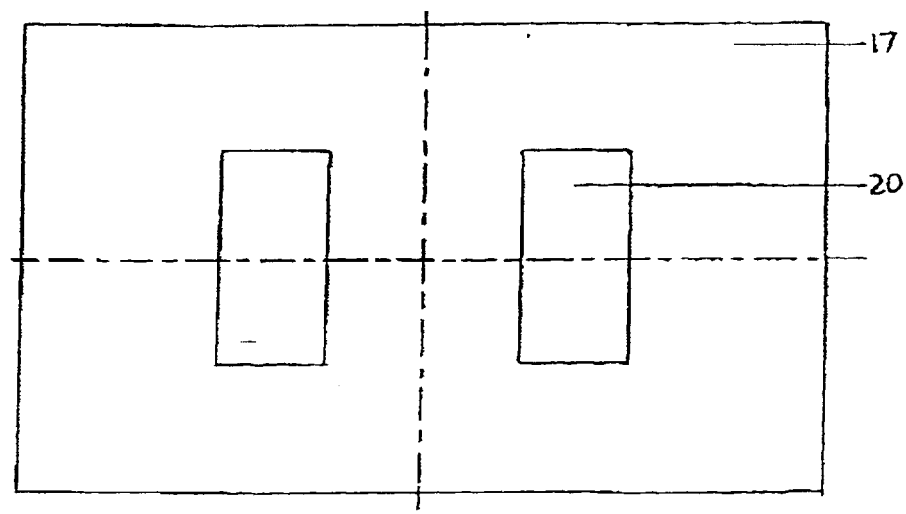
FIG. 6 is a plan view of the substrate layer, which shows two inlet openings of the preferred embodiment of the invention.

In one preferred embodiment of the invention illustrated in FIG. 6, in the substrate layer 18 are provided two rectangular inlet ports 20, although it is not intended that the number of inlet be in any way limited. Further, there is a conductive layer 17, which is preferably coated with a dielectric material to avoid an electrical short circuit with electrode 9 the fluid flowing through microvalve 1, in or on the top surface of the substrate layer 18. By design, the substrate layer 18 is not planar on its surface opposing valve plate layer 25 (its upper surface in FIG. 2), but designed such that the distance $d_i$ between valve plate layer 18 and valve plate layer 25 is different for different valve plates 7. In the preferred embodiment of the invention illustrated in FIG. 2, substrate layer 18 is arranged such that left valve plate has a distance $d_1$, middle valve plate has a distance $d_2$, and right valve plate has a distance $d_3$ from the substrate layer, such that $d_1<d_2<d_3$. With such an arrangement, according to Eq. 1, the electrostatic forces $F_e$ acting on the different valve plates will also be different, with the valve plate with the smallest distance from the substrate layer experiencing the greatest electrostatic force. Thus, in the preferred embodiment illustrated in FIG. 2, $F_{e^1}>F_{e^2}>F_{e^3}$. On application of a certain threshold voltage, electrodes 9 and 17 will be electrostatically charged, and since $F_{e^1}$ is the largest electrostatic force, acting on the left valve plate, this valve plate will be the first to be activated, so resulting in the flow of fluid from inlet chamber 13 through the left hand valve and into outlet chamber 4. This will result in an increase in the pressure in outlet chamber 4 from $p_{out}$ to $p_2$ (Eq. 5). As a result, the electrostatic force required to overcome the pressure difference across the middle valve plate will be significantly less than the force that was required to open the first valve plate when all of the valves were in the initially closed position.

Because the electrostatic force required to open each subsequent valve is less than for the preceding valve, the distance separating the valve plate 25 from the substrate layer 18 can be successively greater, in accordance with Eq. 1, but within the limits of the size of the microvalve. This increase in distance will in turn increase the peripheral area of the orifice and hence the rate of fluid flow through each subsequent valve orifice. As a result of the successively decreasing pressure differential across the valve plate caused by fluid flowing into the outlet chamber 4, the electrostatic force, $F_{e^3}$ required to move the last valve plate in (the right hand valve plate in FIG. 2) is significantly less than the electrostatic force $F_{e^1}$ which was required to move the first valve plate when the entire valve was in the initially closed position. It is to be noted that a force is also transferred from the first valve plate, through membrane layer 25, to the second and subsequent valve plates. The mechanical linkage formed by membrane layer 25 contributes therefore to the opening of the valve, however this effect is very small compared to the hydrostatic force which overcomes the majority of the pressure difference across the valve when the valve is in its initially closed position. The valve plates 7 are thus opened sequentially, according to their distance from substrate layer 18, resulting in an overall flow rate that is considerably greater than achievable with designs with a single fixed distance valve plate, due to the fact that the latter can provide only a relatively small single peripheral area of the valve orifice.

As FIG. 1 and FIG. 2 show, the orifices in each of the three stationary plate layers of the device of the invention are, generally speaking, offset from one another, to ensure fluid flow through as large a part of the device as practicable and to allow equalisation of pressures when the valve is open.

Suitable fabrication methods for the microvalve device of the invention include micromachining techniques, generally known to the skilled reader and not described in further detail here. A number of microvalves may be fabricated in a single wafer substrate.

The invention described herein is susceptible to variations, modifications and/or additions other than those specifically described and it is to be understood that the invention includes all such variations, modifications and/or additions which fall within the spirit and scope of the above invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A normally-closed electrostatic microvalve device of multilayer form comprising:

a stationary valve plate layer, having a plurality of fluid flow orifices therethrough;

a moveable valve plate layer, comprising a plurality of valve elements to close the fluid flow orifices of the stationary valve plate layer, one valve element able to move with a degree of independence from the remaining valve elements, the moveable valve plate layer arranged for deflection under an applied electrostatic force from a normal closed position in which each of said fluid flow orifices of the stationary valve plate layer is closed by a valve element to an open position in which one or more of the valve elements is displaced from said stationary valve plate layer; and a base plate layer spaced from said stationary valve plate layer, the base plate layer having at least one inlet fluid flow orifice therethrough, the base plate layer and the stationary valve plate layer defining therebetween an inlet chamber, the movable valve plate layer being disposed for movement within said inlet chamber, and wherein the base plate layer includes a first conductive electrode element and the movable valve plate layer includes a second conductive electrode element such that application of an electrical potential difference between the respective electrode elements creates an electrostatic force on the movable valve plate layer to activate the microvalve.

2. The microvalve device according to claim 1, wherein the movable valve plate layer comprises resilient flexible portions interconnecting the valve elements, enabling a degree of independent movement to each valve element.

3. The microvalve device according to claim 2, the valve elements supported within the device by resilient restoring support means.

4. The microvalve device according to claim 3, the resilient flexible portions interconnecting the valve elements and the resilient restoring support means being provided by a thin membrane layer forming an integral part of the movable valve plate layer.

5. The microvalve device according to claim 1, wherein application of an electrical potential difference applied between said respective electrode elements results in greater electrostatic force on one valve element than on the remaining one or more valve elements.

6. The microvalve device according to claim 5, wherein the respective electrode elements are provided by a first and a second layer associated with, respectively, the base plate layer and the movable valve plate layer.

7. The microvalve device according to claim 6, wherein each valve element is associated with a portion of said second electrode layer and the separation between said first and said second electrode element differs for different ones of said portions when the microvalve is in its normal closed configuration.

8. The microvalve device according to claim 7, wherein said first electrode layer is disposed in a stepped configuration across the base plate layer, so to provide the differing separations between said first electrode layer and the different portions of said second electrode layer.

9. The microvalve device according to claim 1, wherein each of said first and second electrode elements is encapsulated in its respective layer.

10. The microvalve device according to claim 1, including an outlet plate layer spaced from said stationary valve plate layer, having at least one outlet fluid flow orifice therethrough, the outlet plate layer and the stationary valve plate layer defining therebetween an outlet chamber.

11. The microvalve device according to claim 1, wherein each valve element is provided with a projecting peripheral lip positioned to seal around the periphery of a corresponding orifice of the stationary valve plate layer when the microvalve is in its normal closed configuration.

12. The microvalve device according to claim 1, wherein said orifices of the stationary valve plate are substantially rectangular.

13. The microvalve device according to claim 1, said stationary valve plate layer having three spaced orifices therethrough.

14. The microvalve device according to claim 1, wherein the microvalve is fabricated using micromachining techniques.

15. The microvalve device according to claim 14, fabricated from a silicon wafer.

16. The microvalve device according to claim 14, wherein all the components of the device are integrally formed.

17. A fluid flow control apparatus including at least one microvalve device according to claim 1.

* * * * *